(12) United States Patent
Liu et al.

(10) Patent No.: US 9,722,430 B2
(45) Date of Patent: Aug. 1, 2017

(54) METHOD AND SYSTEM FOR ANALYZING USER LOADS IN COMBINATION WITH TIME INFORMATION

(75) Inventors: Jianming Liu, Beijing (CN); Jiye Wang, Beijing (CN); Ning Li, Beijing (CN); Fengyu Wang, Beijing (CN); Aimei Yan, Beijing (CN); Lifang Yang, Beijing (CN)

(73) Assignees: STATE GRID INFORMATION & TELECOMMUNICATION BRANCH, Beijing (CN); GUO DIAN TONG NETWORK TECHNOLOGY COMPANY LIMITED, Beijing (CN); STATE GRID CORPORATION OF CHINA, Beijing (CN)

( * ) Notice: Subject to any disclaimer, the term of this patent is extended or adjusted under 35 U.S.C. 154(b) by 428 days.

(21) Appl. No.: 14/368,943

(22) PCT Filed: Jan. 19, 2012

(86) PCT No.: PCT/CN2012/070570
§ 371 (c)(1),
(2), (4) Date: Jun. 26, 2014

(87) PCT Pub. No.: WO2013/097313
PCT Pub. Date: Jul. 4, 2013

(65) Prior Publication Data
US 2014/0324242 A1    Oct. 30, 2014

(30) Foreign Application Priority Data

Dec. 31, 2011    (CN) .......................... 2011 1 0460637

(51) Int. Cl.
*H02J 4/00*    (2006.01)
*H02J 3/14*    (2006.01)
*G06Q 50/06*    (2012.01)

(52) U.S. Cl.
CPC ................ *H02J 4/00* (2013.01); *G06Q 50/06* (2013.01); *H02J 3/14* (2013.01);
(Continued)

(58) Field of Classification Search
None
See application file for complete search history.

(56) References Cited

U.S. PATENT DOCUMENTS

2003/0216971 A1*  11/2003  Sick ....................... G01D 4/004
                                                       705/7.36
2004/0117330 A1*   6/2004  Ehlers .................. F24F 11/0012
                                                         705/412
(Continued)

FOREIGN PATENT DOCUMENTS

CN        101464475 B     3/2011
CN        102104251 A     6/2011
JP        2009261159 A    11/2009

OTHER PUBLICATIONS

Wang, Qiying, et al., "Strategies for tire production after readjusting the electricity price in peak and low period," China Rubber/Plastics Technology and Equipment, Year 2008, vol. 34, No. 9, pp. 26-31; ISSN 1009-797X(2008) 09-0026-06 (in Chinese).
International Search Report (in English and Chinese) and Written Opinion of the International Searching Authority (in Chinese) for PCT/CN2012/070570, mailed Oct. 4, 2012; ISA/CN.

*Primary Examiner* — Tuan Dao
(74) *Attorney, Agent, or Firm* — Harness, Dickey & Pierce, P.L.C.

(57) ABSTRACT

A method for analyzing a user load in conjunction with time information and a system thereof are provided. In the case that an enterprise operates in a non-full-time operational mode, operation periods of the enterprise are adjusted, electricity prices for respective adjusted operation periods are obtained, and the electricity prices are multiplied with electricity consumptions to obtain electricity charges of the enterprise. In the case that the enterprise operates in a full-time operational mode, electricity consumptions in (Continued)

respective hours of the enterprise are adjusted, the electricity consumptions are multiplied with electricity prices for the respective hours to obtain electricity charges of the respective hours of the enterprise, and the electricity charges of the respective hours are accumulated to obtain a total electricity charge of the enterprise.

7 Claims, 3 Drawing Sheets

(52) U.S. Cl.
CPC ..... *H02J 2003/146* (2013.01); *Y02B 70/3225* (2013.01); *Y04S 20/222* (2013.01); *Y04S 20/224* (2013.01)

(56) References Cited

U.S. PATENT DOCUMENTS

| | | | | |
|---|---|---|---|---|
| 2004/0181492 A1* | 9/2004 | Rybakowski | .......... | G01D 4/002 |
| | | | | 705/63 |
| 2009/0012916 A1* | 1/2009 | Barnett | .................. | G06Q 50/06 |
| | | | | 705/412 |
| 2010/0070099 A1* | 3/2010 | Watson | .................. | G06Q 50/06 |
| | | | | 700/295 |
| 2010/0179704 A1* | 7/2010 | Ozog | ............... | G06Q 10/06315 |
| | | | | 700/291 |

* cited by examiner

METHOD AND SYSTEM FOR ANALYZING USER LOADS IN COMBINATION WITH TIME INFORMATION

CROSS-REFERENCE TO RELATED APPLICATIONS

This application is the national phase of International Application No. PCT/CN2012/070570, titled "METHOD FOR ANALYZING USER LOAD IN CONJUNCTION WITH TIME INFORMATION AND SYSTEM THEREOF", filed on Jan. 19, 2012, which claims priority to Chinese patent application No. 201110460637.5, titled "METHOD FOR ANALYZING USER LOAD IN CONJUNCTION WITH TIME INFORMATION AND SYSTEM THEREOF" and filed with the State Intellectual Property Office of People's Republic of China on Dec. 31, 2011, which are incorporated herein by reference in their entirety.

FIELD

The present disclosure relates to the technical field of electric power system, in particular, to a method for analyzing a user load in conjunction with time information and a system thereof.

BACKGROUND

Peak-valley time-of-use electricity prices are generally adopted by an electric power grid company to encourage an enterprise to reasonably arrange time to use electricity, thereby shaving the peak and filling the valley, and improving the efficiency in using electric power resources. The peak-valley time-of-use electricity prices refer to different electricity prices respectively set for multiple periods, such as peak periods, flat periods and valley periods, obtained by diving 24 hours of a day based on the varying load of the electric power grid.

An enterprise may operate in a non-full-time operational mode or in a full-time operational mode, which depends on different work natures. Conventionally, both the enterprises operating in the non-full-time operational mode and the enterprises operating in the full-time operational mode operate merely in accordance with timetables set by themselves. The timetables may include peak load periods, flat load periods or valley load periods. If the enterprises mostly operate in the peak load periods, the electricity costs may be heavy.

SUMMARY

In view of the above, a method for analyzing a user load in conjunction with time information and a system thereof are provided in the disclosure, to reduce an electricity cost of an enterprise.

To achieve the above objective, a solution is proposed as follows.

A method for analyzing a user load in conjunction with time information includes:

obtaining operation periods of an enterprise and corresponding electricity consumptions in the case that the enterprise operates in a non-full-time operational mode; adjusting the operation periods of the enterprise; and obtaining electricity prices for respective adjusted operation periods of the enterprise based on a preset load distribution table and a preset electricity price table; where peak load periods, flat load periods and valley load periods of a region in which the enterprise locates are stored in the load distribution table, and electricity prices corresponding to the peak load periods, the flat load periods and the valley load periods are stored in the electricity price table;

obtaining electricity charges of the respective operation periods of the enterprise by multiplying the electricity prices for the respective operation periods and electricity consumptions in the respective operation periods; and obtaining a total electricity charge of the enterprise by accumulating the electricity charges of the respective operation periods of the enterprise;

or the method includes:

obtaining and adjusting electricity consumptions in respective hours of the enterprise if the enterprise operates in a full-time operational mode; and obtaining electricity prices for the respective hours of the enterprise based on the load distribution table and the electricity price table;

obtaining electricity charges of the respective hours of the enterprise by multiplying the electricity prices for the respective hours of the enterprise and adjusted electricity consumptions in the respective hours; and obtaining a total electricity charge of the enterprise by accumulating the electricity charges of the respective hours of the enterprise.

Preferably, the method for analyzing the user load in conjunction with the time information further includes:

outputting the total electricity charge of the enterprise.

Preferably, the method for analyzing the user load in conjunction with the time information further includes:

obtaining an original total electricity charge of the enterprise; and calculating a difference between the total electricity charge and the original total electricity charge of the enterprise, and a ratio of a saved electricity charge over the original total electricity charge of the enterprise.

Preferably, the method for analyzing the user load in conjunction with the time information further includes:

outputting the difference between the total electricity charge and the original total electricity charge of the enterprise, and the ratio of the saved electricity charge over the original total electricity charge of the enterprise.

A system for analyzing a user load in conjunction with time information includes a operational mode determining unit, an obtaining unit, an electricity price determining unit and a first calculating unit.

The operational mode determining unit is for determining whether an enterprise operates in a non-full-time operational mode or in a full-time operational mode.

The obtaining unit is for obtaining operation periods of the enterprise and corresponding electricity consumptions if the enterprise operates in the non-full-time operational mode, or obtaining electricity consumptions in respective hours of the enterprise if the enterprise operates in the full-time operational mode.

The electricity price determining unit is for adjusting the operation periods of the enterprise and obtaining electricity prices for respective adjusted operation periods of the enterprise based on a preset load distribution table and a preset electricity price table, if the enterprise operates in the non-full-time operational mode; or adjusting the electricity consumptions in the respective hours of the enterprise and obtaining electricity prices for the respective hours of the enterprise based on the load distribution table and the electricity price table, if the enterprise operates in the full-time operational mode;

where peak load periods, flat load periods and valley load periods of a region in which the enterprise locates are stored in the load distribution table, and electricity prices corresponding to the peak load periods, the flat load periods and the valley load periods are stored in the electricity price table.

The first calculating unit is for obtaining electricity charges of the respective operation periods of the enterprise by multiplying the electricity prices for the respective operation periods and electricity consumptions in the respective operation periods and obtaining a total electricity charge of the enterprise by accumulating the electricity charges of the respective operation periods of the enterprise, if the enterprise operates in the non-full-time operational mode; or obtaining electricity charges of the respective hours of the enterprise by multiplying the electricity prices for the respective hours of the enterprise and adjusted electricity consumptions in the respective hours and obtaining a total electricity charge of the enterprise by accumulating the electricity charges of the respective hours of the enterprise, if the enterprise operates in the full-time operational mode.

Preferably, the system for analyzing the user load in conjunction with the time information further includes a second calculating unit, for obtaining an original total electricity charge of the enterprise and calculating a difference between the total electricity charge and the original total electricity charge of the enterprise and a ratio of a saved electricity charge over the original total electricity charge of the enterprise.

Preferably, the system for analyzing the user load in conjunction with the time information further includes an output unit, for outputting the total electricity charge of the enterprise, the difference between the total electricity charge and the original total electricity charge of the enterprise, and the ratio of the saved electricity charge over the original total electricity charge of the enterprise.

As can be seen from the above technical solution, in the method for analyzing the user load in conjunction with the time information and the system thereof, if the enterprise operates in the non-full-time operational mode, the operation periods of the enterprise are adjusted and the electricity prices for the operation periods are obtained, and the electricity charges of the enterprise are obtained by multiplying the electricity prices and the electricity consumptions; alternatively, if the enterprise operates in the full-time operational mode, the electricity consumptions in the respective hours of the enterprise are adjusted, the electricity charges of the respective hours of the enterprise are obtained by multiplying the electricity consumptions and the electricity prices for the respective hours, and the total electricity charge of the enterprise is obtained by accumulating the electricity charges of the respective hours. With the method for analyzing the user load in conjunction with the time information and the system thereof, the enterprise may obtain the total electricity charge in case of adjusted operation periods or adjusted electricity consumptions in the respective hours, and accordingly, the enterprise may reasonably arrange the operation periods in condition of being aware of the electricity charges required under different time or different workloads, to reduce an electricity cost.

BRIEF DESCRIPTION OF THE DRAWINGS

Drawings to be used in descriptions of embodiments or conventional technologies are described briefly hereinafter to clarify a technical solution according to the embodiments of the disclosure or according to the conventional technologies. It is obvious that the drawings in the following descriptions are only some embodiments of the disclosure. Other drawings may be further obtained by those skilled in the art based on these drawings without any creative works.

DETAILED DESCRIPTION OF THE EMBODIMENTS

A technical solution according to embodiments of the disclosure is described clearly and completely hereinafter in conjunction with drawings used in the embodiments of the disclosure. It is obvious that the described embodiments are only part of, rather than all of the embodiments of the disclosure. All other embodiments obtained by those skilled in the art based on the embodiments of the disclosure without any creative works should fall in the scope of the disclosure.

A method for analyzing a user load in conjunction with time information and a system thereof are disclosed according to the embodiments of the disclosure, to make an enterprise reasonably arrange operation periods to achieve a lowest electricity cost in case of a same electricity consumption, thereby reducing the electricity cost.

Figure 1:
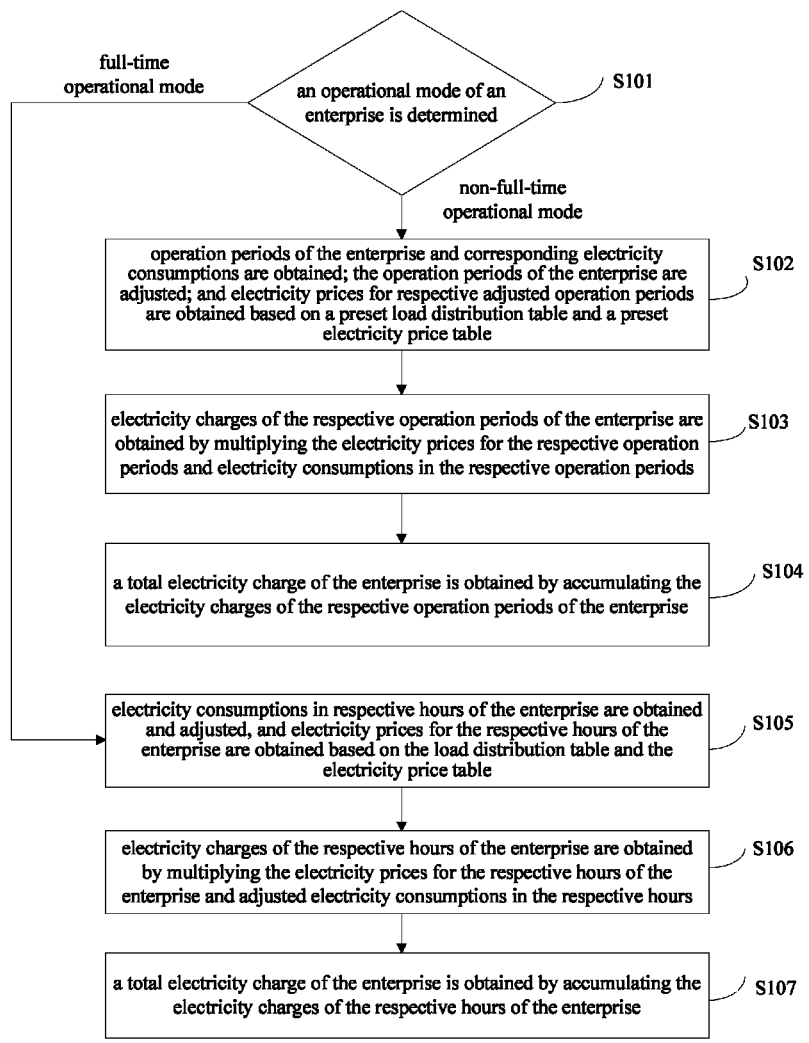
FIG. 1 is a flowchart of a method for analyzing a user load in conjunction with time information according to an embodiment of the disclosure.

Specifically, as shown in FIG. 1, the method for analyzing the user load in conjunction with the time information includes the following steps S101 to S107.

In the step S101, an operational mode of an enterprise is determined. If the enterprise operates in a non-full-time operational mode, the step S102 is performed.

In the step S102, operation periods of the enterprise and corresponding electricity consumptions are obtained; the operation periods of the enterprise are adjusted; and electricity prices for respective adjusted operation periods are obtained based on a preset load distribution table and a preset electricity price table. Peak load periods, flat load periods and valley load periods of a region in which the enterprise locates are stored in the load distribution table. Electricity prices corresponding to the peak load periods, the flat load periods and the valley load periods are stored in the electricity price table.

The load distribution table and the electricity price table of a certain region are shown with the following two tables;

a distribution of peak periods and valley periods of the region is shown as follows;

| | periods | | | | | | | | |
|---|---|---|---|---|---|---|---|---|---|
| | 00:00-07:00 | 07:00-08:00 | 08:00-11:30 | 11:30-15:00 | 15:00-16:00 | 16:00-18:30 | 18:30-22:00 | 22:00-23:00 | 23:00-24:00 |
| valley/peak/flat | valley | flat | peak | flat | peak | flat | peak | flat | valley | and an industry electricity price policy of the certain region is reflected as follows.

|  | periods | | |
| --- | --- | --- | --- |
|  | peak periods | flat periods | valley periods |
| electricity price Yuan/kWh | 1.1467 | 0.7683 | 0.3899 |

In the step S103, electricity charges of the respective operation periods of the enterprise are obtained by multiplying the electricity prices for the respective operation periods and electricity consumptions in the respective operation periods.

In the step S104, a total electricity charge of the enterprise is obtained by accumulating the electricity charges of the respective operation periods of the enterprise.

If the enterprise operates in a full-time operational mode, the step S105 is performed. In the step S105, electricity consumptions in respective hours of the enterprise are obtained and adjusted, and electricity prices for the respective hours of the enterprise are obtained based on the load distribution table and the electricity price table.

In the step S106, electricity charges of the respective hours of the enterprise are obtained by multiplying the electricity prices for the respective hours of the enterprise and adjusted electricity consumptions in the respective hours.

In the step S107, a total electricity charge of the enterprise is obtained by accumulating the electricity charges of the respective hours of the enterprise.

After the total electricity charge of the enterprise is obtained, it may be output and displayed, for observation.

Specifically, with the method for analyzing the user load in conjunction with the time information and the system thereof, the enterprise may obtain the total electricity charge in case of adjusted operation periods of the enterprise or adjusted electricity consumptions in the respective hours, and accordingly, the enterprise reasonably arranges the operation periods in condition of being aware of the electricity charges required under different operation time or different workloads, to reduce the electricity cost.

Figure 2:
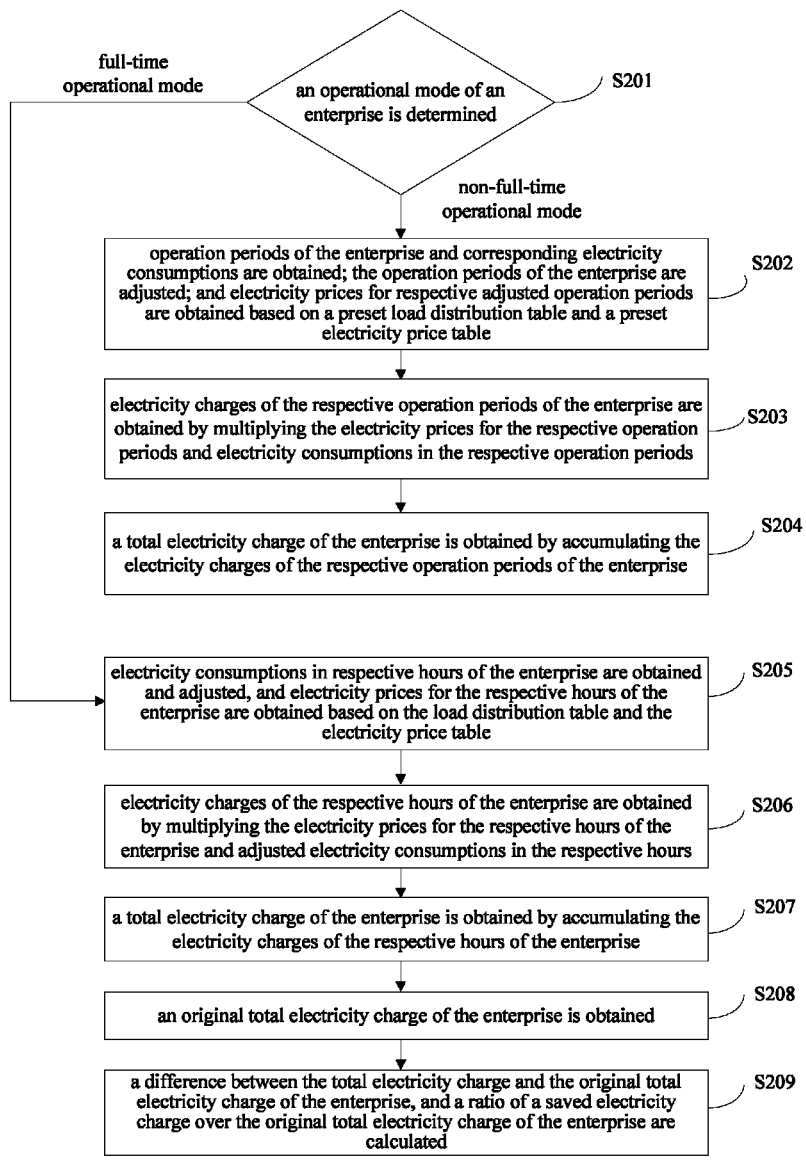
FIG. 2 is a flowchart of a method for analyzing a user load in conjunction with time information according to another embodiment of the disclosure.

A method for analyzing a user load in conjunction with time information is further disclosed according to another embodiment of the disclosure. As shown in FIG. 2, the method includes the following steps S201 to S209.

In the step S201, an operational mode of an enterprise is determined.

If the enterprise operates in a non-full-time operational mode, the step S202 is performed. In the step S202, operation periods of the enterprise and corresponding electricity consumptions are obtained, the operation periods of the enterprise are adjusted, and electricity prices for respective adjusted operation periods of the enterprise are obtained based on a load distribution table and a electricity price table. Peak load periods, flat load periods and valley load periods of a region in which the enterprise locates are stored in the load distribution table. Electricity prices corresponding to the peak load periods, the flat load periods and the valley load periods are stored in the electricity price table.

In the step S203, electricity charges of the respective operation periods of the enterprise are obtained by multiplying the electricity prices for the respective operation periods and electricity consumptions in the respective operation periods.

In the S204, a total electricity charge of the enterprise is obtained by accumulating the electricity charges of the respective operation periods of the enterprise If the enterprise operates in a full-time operational mode, the step S205 is performed. In the step S205, electricity consumptions in respective hours of the enterprise are obtained and adjusted, and electricity prices for the respective hours of the enterprise are obtained based on the load distribution table and the electricity price table.

In the step S206, electricity charges of the respective hours of the enterprise are obtained by multiplying the electricity prices for the respective hours of the enterprise and adjusted electricity consumptions in the respective hours.

In the step S207, a total electricity charge of the enterprise is obtained by accumulating the electricity charges of the respective hours of the enterprise.

In the step S208, an original total electricity charge of the enterprise is obtained.

In the step S209, a difference between the total electricity charge and the original total electricity charge of the enterprise, and a ratio of a saved electricity charge over the original total electricity charge of the enterprise are calculated.

Similarly, the difference between the total electricity charge and the original total electricity charge of the enterprise and the ratio of the saved electricity charge over the original total electricity charge of the enterprise may be output and displayed as required.

According to the embodiment, after the total electricity charge in case of adjusted operation periods of the enterprise or adjusted electricity consumptions in the respective hours is obtained, the original total electricity charge of the enterprise is obtained, and the difference between the total electricity charge and the original total electricity charge, and the ratio of the saved electricity charge and the original total electricity charge are calculated. Therefore, a difference, between a total electricity charge of the enterprise generated after the operation periods or an electricity consumption in a certain period is adjusted and a total electricity charge generated before the operation periods or the electricity consumption in the certain period is adjusted, may be clearly obtained.

Figure 3:
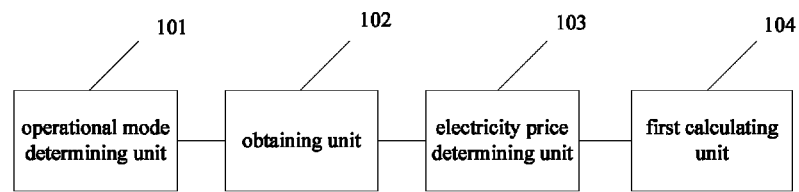
FIG. 3 is a schematic structural diagram of a system for analyzing a user load in conjunction with time information according to an embodiment of the disclosure.

As shown in FIG. 3, a system for analyzing a user load in conjunction with time information disclosed according to an embodiment of the disclosure includes an operational mode determining unit 101, an obtaining unit 102, an electricity price determining unit 103 and a first calculating unit 104.

The operational mode determining unit 101 is for determining whether an enterprise operates in a non-full-time operational mode or in a full-time operational mode.

The obtaining mode 102 is for obtaining operation periods of the enterprise and corresponding electricity consumptions if the enterprise operates in the non-full-time operational mode, or obtaining electricity consumptions in respective hours of the enterprise if the enterprise operates in the full-time operational mode.

The electricity price determining unit 103 is for adjusting the operation periods of the enterprise and obtaining electricity prices for respective adjusted operation periods of the enterprise based on a preset load distribution table and a preset electricity price table, if the enterprise operates in the non-full-time operational mode; or adjusting the electricity consumptions in the respective hours of the enterprise and obtaining electricity prices for the respective hours of the enterprise based on the load distribution table and the electricity price table, if the enterprise operates in the full-time operational mode;

where peak load periods, flat load periods and valley load periods of a region in which the enterprise locates are stored in the load distribution table, and electricity prices corresponding to the peak load periods, the flat load periods and the valley load periods are stored in the electricity price table.

The first calculating unit 104 is for obtaining electricity charges of the respective operation periods of the enterprise by multiplying the electricity prices for the respective operation periods and electricity consumptions in the respective operation periods and obtaining a total electricity charge of the enterprise by accumulating the electricity charges of the respective operation periods of the enterprise, if the enterprise operates in the non-full-time operational mode; or obtaining electricity charges of the respective hours of the enterprise by multiplying the electricity prices for the respective hours of the enterprise and adjusted electricity consumptions in the respective hours and obtaining a total electricity charge of the enterprise by accumulating the electricity charges of the respective hours of the enterprise, if the enterprise operates in the full-time operational mode.

The system for analyzing the user load in conjunction with the time information according to the embodiment of the disclosure further includes a second calculating unit, for obtaining an original total electricity charge of the enterprise and calculating a difference between the total electricity charge and the original total electricity charge of the enterprise and a ratio of a saved electricity charge over the original total electricity charge of the enterprise.

To output the electricity charge of the enterprise calculated by the system for analyzing the user load in conjunction with the time information, the system for analyzing the user load in conjunction with the time information further includes an output unit, for outputting the total electricity charge of the enterprise, the difference between the total electricity charge and the original total electricity charge of the enterprise, and the ratio of the saved electricity charge over the original total electricity charge of the enterprise.

Specifically, the output unit may be various display devices or various sounding devices.

The embodiments of the disclosure are described herein in a progressive manner. Differences from other embodiments are emphasized in the explanation of each embodiment, while same or similar parts among the embodiments may be referred to each other.

The disclosure may be implemented or used by those skilled in the art based on the above explanations of the disclosed embodiments. Numerous modifications to the embodiments are apparent to those skilled in the art. The general principle herein may be implemented in other embodiments without departing from the spirit or scope of the disclosure. Therefore, the disclosure may not be limited to the embodiments described herein, and should be in accordance with a widest scope consistent with the principle and novel features disclosed herein.

The invention claimed is:

1. A method for analyzing a user load in conjunction with time information, comprising:
    determining whether an enterprise operates in a non-full-time operational mode or in a full-time operational mode;
    obtaining operation periods of the enterprise and corresponding electricity consumptions in the case that the enterprise operates in a non-full-time operational mode, adjusting the operation periods of the enterprise, and obtaining electricity prices for respective adjusted operation periods of the enterprise based on a preset load distribution table and a preset electricity price table, wherein peak load periods, flat load periods and valley load periods of a region in which the enterprise locates are stored in the load distribution table, and electricity prices corresponding to the peak load periods, the flat load periods and the valley load periods are stored in the electricity price table;
    obtaining electricity charges of the respective operation periods of the enterprise by multiplying the electricity prices for the respective operation periods and electricity consumptions in the respective operation periods; and
    obtaining a total electricity charge of the enterprise by accumulating the electricity charges of the respective operation periods of the enterprise;
    and the method comprises:
    obtaining and adjusting electricity consumptions in respective hours of the enterprise in the case that the enterprise operates in a full-time operational mode; and obtaining electricity prices for the respective hours of the enterprise based on the load distribution table and the electricity price table;
    obtaining electricity charges of the respective hours of the enterprise by multiplying the electricity prices for the respective hours of the enterprise and adjusted electricity consumptions in the respective hours; and
    obtaining a total electricity charge of the enterprise by accumulating the electricity charges of the respective hours of the enterprise.

2. The method according to claim 1, further comprising outputting the total electricity charge of the enterprise.

3. The method according to claim 1, further comprising:
    obtaining an original total electricity charge of the enterprise; and
    calculating a difference between the total electricity charge and the original total electricity charge of the enterprise, and a ratio of a saved electricity charge over the original total electricity charge of the enterprise.

4. The method according to claim 3, further comprising:
    outputting the difference between the total electricity charge and the original total electricity charge of the enterprise, and the ratio of the saved electricity charge over the original total electricity charge of the enterprise.

5. A system for analyzing a user load in conjunction with time information, comprising a processor and a memory storing program codes, wherein the processor performs the stored program codes to:
    determine whether an enterprise operates in a non-full-time operational mode or in a full-time operational mode;
    obtain operation periods of the enterprise and corresponding electricity consumptions in the case that the enterprise operates in the non-full-time operational mode, or obtain electricity consumptions in respective hours of the enterprise in the case that the enterprise operates in the full-time operational mode;
    adjust the operation periods of the enterprise and obtain electricity prices for respective adjusted operation periods of the enterprise based on a preset load distribution table and a preset electricity price table, in the case that the enterprise operates in the non-full-time operational mode; or adjust the electricity consumptions in the respective hours of the enterprise and obtain electricity prices for the respective hours of the enterprise based on the load distribution table and the electricity price table, in the case that the enterprise operates in the full-time operational mode; wherein peak load periods, flat load periods and valley load periods of a region in which the enterprise locates are stored in the load distribution table, and electricity prices corresponding to the peak load periods, the flat load periods and the valley load periods are stored in the electricity price table; and obtain electricity charges of the respective operation periods of the enterprise by multiplying the electricity prices for the respective operation periods and electricity consumptions in the respective operation periods and obtain a total electricity charge of the enterprise by accumulating the electricity charges of the respective operation periods of the enterprise, in the case that the enterprise operates in the non-full-time operational mode; or obtain electricity charges of the respective hours of the enterprise by multiplying the electricity prices for the respective hours of the enterprise and adjusted electricity consumptions in the respective hours and obtain a total electricity charge of the enterprise by accumulating the electricity charges of the respective hours of the enterprise, in the case that the enterprise operates in the full-time operational mode.

6. The system according to claim 5, wherein the processor further performs the stored program codes to:

obtain an original total electricity charge of the enterprise, and calculate a difference between the total electricity charge and the original total electricity charge of the enterprise and a ratio of a saved electricity charge over the original total electricity charge of the enterprise.

7. The system according to claim 6, wherein the processor further performs the stored program codes to:

output the total electricity charge of the enterprise, the difference between the total electricity charge and the original total electricity charge of the enterprise, and the ratio of the saved electricity charge over the original total electricity charge of the enterprise.

* * * * *